Patented Aug. 7, 1945

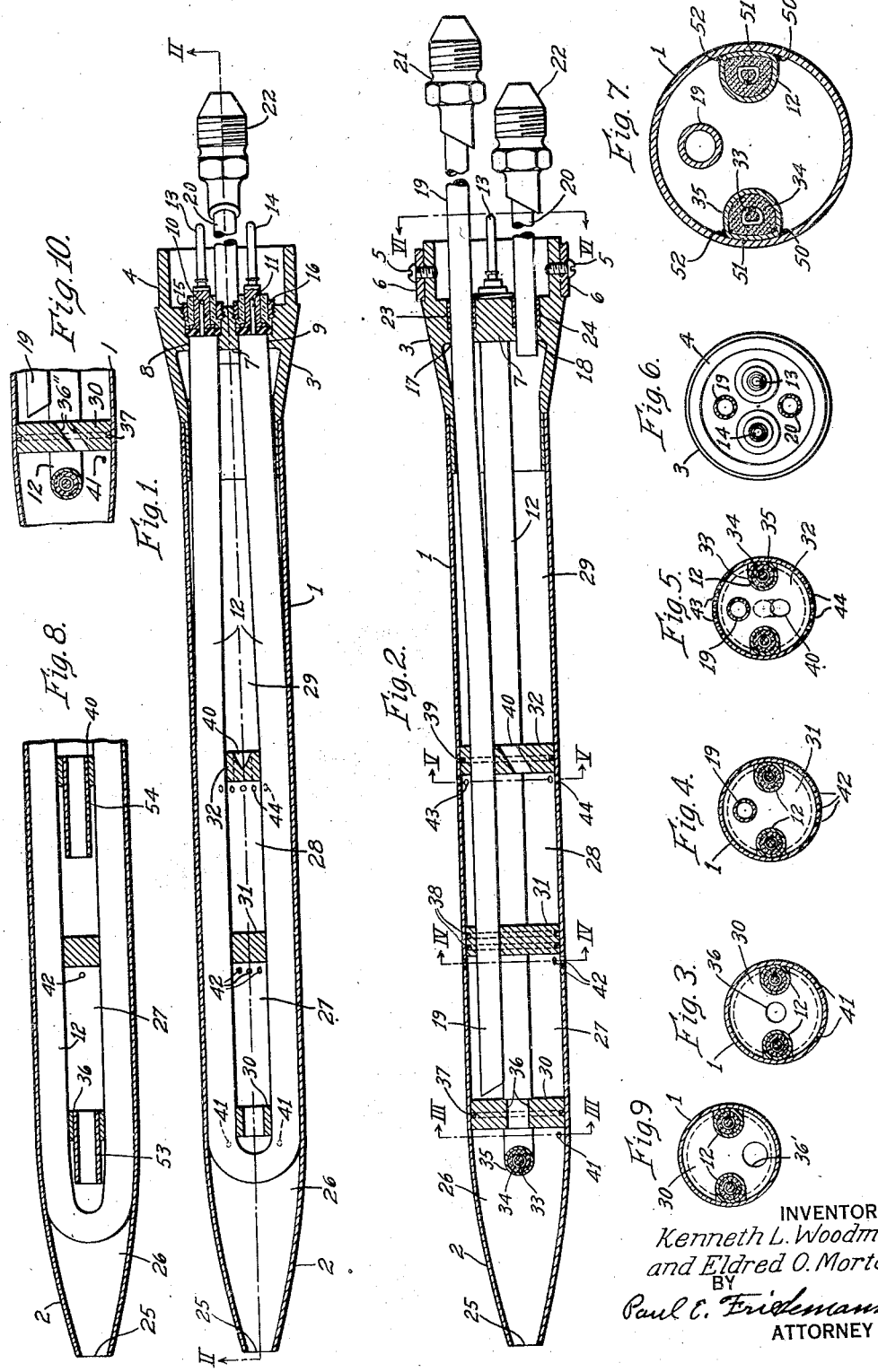

2,381,327

UNITED STATES PATENT OFFICE 2,381,327

PITOT STATIC AIR-SPEED INDICATOR

Kenneth L. Woodman and Eldred O. Morton, Mansfield, Ohio, assignors to Westinghouse Electric Corporation, East Pittsburgh, Pa., a corporation of Pennsylvania Application February 19, 1944, Serial No. 523,052

21 Claims. (Cl. 73—212)

Our invention relates to devices for indicating the speed of a craft with reference to the medium through which it moves and more particularly to Pitot-static tubes, static tubes, and Pitot tubes.

Our invention has particular utility for indicating the air speed of an aircraft by means of the measurement of the static air pressure, the dynamic air pressure, and the measurement of the relative dynamic and static pressures. Our invention is, however, not limited to this particular application but is applicable to any field of use where static and dynamic fluid pressures are to be measured.

As is well known, Pitot-static tubes are mounted on the outer portion of an aircraft wing, outboard strut or other location of an aircraft where the tube openings will be exposed to undisturbed air flow. By means of suitable pipes the tube openings are connected to an instrument on the instrument panel. The dynamic pressure is usually communicated to the interior of a hermetically sealed chamber having a movable diaphragm in one wall thereof for operating an indicator, and the static pressure is communicated to the outside of the chamber to exert a pressure on the diaphragm in opposition to the dynamic pressure effect. The differential pressure effect is thus indicated by the instrument thus indicating, or recording, as may be desired, the speed of the fluid relative to the Pitot-static tube. With other instruments the two pressures are communicated to two Bourdon tubes coupled mechanically at their movable ends in opposition or communicated to two "Sylphon" bellows constructed like the "Sylphon" bellows of aneroid barometers, which "Sylphon" bellows are also mechanically coupled in opposition at their movable portions to thus produce indicator measurements proportional to the pressure differences in the two pressure responsive members. To make the instrument particularly useful to the pilot, the calibration is usually in miles per hour.

Since the Pitot tube must necessarily be located in the undisturbed region of the air, it is exposed to all climatic conditions and thus is particularly subject to the temperature of the surrounding air and the moisture content thereof. The introduction of moisture into the Pitot-static tube at low temperatures encountered during certain seasons and at high altitudes may result in erroneous operation of the air speed meters by ice formation in the air passages of said Pitot-static tube.

One object of our invention is the prevention of any obstructing moisture whether in the form of ice or in the form of liquid in the passages and connecting tubes of Pitot-static tubes, static tubes, and Pitot tubes.

Another object of our invention is the provision of means for heating a Pitot-static tube by means that may be readily manufactured and readily assembled and by means of which the heat is properly distributed so that moisture, in the form of ice or otherwise, that may collect in the tube is readily and continuously discharged from the tube.

Another object is the provision of a single efficient heating unit for a Pitot-static tube that is mounted in fixed relation to the tube and is in good heat conducting relation to the tube.

A still further object of our invention is the provision of an improved tube construction for air speed indicators.

An important object of our invention is to simplify the construction and assembly and reduce the cost of the heater unit for electrically heated air-speed tubes.

Another important object of our invention is the provision of a single loop of an electrical heater disposed longitudinally of and in good heat-conducting relation to the Pitot-static tube.

It is also a broad object of our invention to provide an electrically heated Pitot-static tube of simple structure and having elements that may be easily and cheaply assembled and that may have improved operating characteristics.

Other objects and advantages will become more apparent from a study of the following specification and the accompanying drawing, in which:

Figure 1 is a longitudinal sectional view of the housing portion of a Pitot-static tube;

Fig. 2 is a longitudinal sectional view substantially normal to the section plane of Fig. 1;

Figs. 3, 4, 5 and 6 are transverse sectional views on section lines III—III, IV—IV, V—V, and VI—VI, respectively, of Fig. 2.

Fig. 7 is a transverse sectional view of a modified mounting of the heater unit in the plugs and with relation to the outer tube;

Fig. 8 is a longitudinal sectional view of a modification showing the use of stub-tubes in the heat distributing plugs;

Fig. 9 is a showing on a transverse section line corresponding to section line III—III of Fig. 2, of a modification of our invention; and Fig. 10 is a fragmentary longitudinal sectional view of a modification of certain parts of our invention.

So far as the outer contour of our improved Pitot-static tube is concerned, it is conventional in shape, that is, it has an outer cylindrical tube or casing 1 provided with a tapered forward end 2. The casing is preferably made of sheet or extruded brass, copper, or some other metal or alloy having good heat conducting properties and being resistant to corrosion. Since this sheet material is easily formed, the tapered end 2 may be formed by spinning.

At the rear end, the tube 1 fits a machined portion of the brass or copper casting 3 and is secured to the casting by soldering or brazing or in some other suitable manner. The casting has a supporting portion 4. This supporting portion is provided with threaded radial openings, as shown in Fig. 2, for receiving a suitable number of mounting screws 5 usually four providing the rigid interconnection between the casting 3 and the cylindrical bracket 6 which is rigidly mounted on some suitable portion of the aircraft. The point of connection of the air speed tube is so selected that it is rigidly supported to point in the direction the aircraft is pointing and preferably at a region of air flow substantially undisturbed by the craft itself.

The casting, or end member 3, has a wall 7 having a pair of apertures 8 and 9, as shown in Fig. 1, for receiving the conductors 10 and 11 leading to the heater unit 12 described more in detail hereinafter. The sheath 35 of said heater is sealed in apertures 8 and 9 in a fluid-tight relation such as by brazing.

The conductors 10 and 11 are suitably connected to the connector studs 13 and 14 within the porcelain ferrules shown, and the parts are held in firm relation to the wall 7 by nuts 15 and 16 for driving the porcelain ferrules against the relatively soft mica washers disposed to the left of the porcelain ferrules, all as shown.

The wall 7 is also provided with two further apertures 17 and 18 for receiving through seals 23 and 24, the outlet tubes 19 and 20 for the dynamic and static pressures, respectively. These tubes are connected, by means of pipe connections 21 and 22, to another pair of tubes leading to the air speed indicating instrument (not shown).

At the nose or left-hand end of casing 1, we provide the opening 25 for receiving the dynamic air pressure and for communicating that pressure to the region, or chamber, 26.

The casing 1 is divided into four chambers 26, 27, 28 and 29 by the generally banner-stone-shaped plugs 30, 31, and 32 each having substantially symmetrically disposed upper and lower wings. Said plugs also serve to conduct and distribute heat from said U-shaped heater unit 12 to the casing 1. Each of the plugs receives the legs of the elongated U-shaped heater between the wings so that the plugs and heater unit may be assembled as a unit before being inserted and fixed into the casing 1. Each plug or partition is brazed to the heater sheath 35 and casing 1 to provide an intimate thermal path from said heater to said casing.

The heater unit comprises a sheath of austenitic corrosion-resisting metal 35 preferably of high thermal conductivity such as steel or copper which may be brazed or soldered to the plugs in proper position. The plugs are preferably of copper, or some copper alloy, or other metal alloy having good heat conducting properties.

The electrical heating wire 33 consisting either of a single round conductor, or of a conductor, wound in a helix, as shown is embedded in the magnesium oxide filler 34. This magnesium oxide filler is a good electrical insulating material but yet is a reasonably good conductor of heat when compacted. The filler 34 holds the conducting wire 33 in spaced relation to the sheath 35 to electrically insulate the wire 33 from the sheath 35 and at the same time permits the heat to flow from the wire 33 to the sheath 35.

When the sheath 35 is cylindrical in shape, as shown in Figs. 1 to 6, inclusive, and Fig. 9, a considerable amount of brazing material may be needed at the region of the sheath contiguous to the inner surface of the casing to obtain good heat transfer from the heater unit to the casing and to the plugs. To reduce the amount of brazing material needed, to improve the heat transfer from the sheath to the casing and plugs, and to eliminate the possibility that the brazed connection between the sheath and the inner surface of the casing may not be continuous for the entire length of the heater unit, and to provide continuous contact of the sheath with the casing 1, we may shape the heater unit as shown in Fig. 7. The heater unit, sheath, filler and wire, is sufficiently pliable so that the sectional shape shown in Fig. 7, may be readily made. With the heater unit thus shaped the contact region between heater and casing is changed from a line contact to one of considerable surface area. Only a small amount of brazing material is needed at regions 50, 51, and 52, and the outer contour of the sheath at the contiguous region conforms to the inner contour of the casing. Further, since the sheath also conforms more accurately to the openings in the plugs the possibility of making leaky connections at the plugs is reduced to a minimum. The number of rejects is thus reduced.

By the use of this single elongated U-shaped heater unit, we are enabled to locate the heat generating wire very close to the nose 2. This is very advantageous in preventing or removing detrimental icing on and within the tube. If necessary the bight of the U of the heating element may be made even narrower than shown in Figs. 1 and 2 so that it may fit snugly against the spun portion 2 to within a relatively short distance of the opening 25. This latter arrangement is shown in Fig. 8.

From the construction of the heater unit, assembled on the plugs before the final positioning of the unit in the casing, it is apparent that our arrangement of parts has a low manufacturing cost and improved operating characteristics. The individual parts are easily made and assembled and may be rigidly mounted in casing 1 with but one furnace brazing operation.

The plug 30 has a central opening 36 to thus place chambers 26 and 27 in communication. This opening, as opening 36'' shown in Fig. 10, may slope upwardly from the chamber 26 to chamber 27 or be positioned as shown in Figs. 1 and 3. The outer periphery of the plug 30 is provided with grooves for receiving arcuate pieces of brazing material 37.

The plug 31 has an opening in the upper wing for receiving the left-hand end of tube 19 so that the end thereof extends into the chamber 27. The plug 31 is provided with circumferential grooves for receiving arcuate pieces of brazing, or soldering, material 38. Sufficient brazing material is used so that when the brazing operation is being done a perfect seal is formed between the plug 31, the sheath 35 and the casing 1. No air or fluid entering the opening 25 can thus pass into the chamber 28.

The plug 32 has an opening in the upper wing for receiving the tube 19, and, like plug 30, is provided with circumferential grooves for receiving arcuate pieces of brazing material 39. This plug is also provided with a central opening 40 like plug 30, but this opening slants upwardly from chamber 28 into chamber 29.

At the bottom of chamber 26 just to the left of plug 30, the casing 1 is provided with one, or more, small holes 41. Any moisture that enters the opening 25 is, by virtue of the heating plug 30, kept in fluid state and is thus discharged through these holes 41. Any air that is carried into chamber 27 is thus heated somewhat and is relatively dry.

The opening 36 need not be central as shown in Fig. 3 but may be located near the bottom of the plug as at 36' shown in Fig. 9. With some types of tube and instrument combinations the calibration may provide difficulties, or be time consuming. To reduce the calibration error we may eliminate the drain holes 41 in front of plug 30. The drain holes 41 not only drain off moisture but also drain off some dynamic pressure so that for minimum calibration error, the ratio of the total area of the drain holes to the area of the nose opening 25 should be as small as possible. Therefore, by reducing the number of drain holes, it is clear that the accuracy is improved.

To make certain that the moisture gets to the drain openings 42 the opening 36', when used instead of 36, may be larger than 36, and is placed near the bottom of plug 30. The front plug 30 in this instance still serves as a heat distributing means as well as a baffle for the forward end of the dynamic pressure collecting tube.

To form more effective baffles against moisture being transferred from chamber 28 to 29, or from chamber 26 to chamber 27, when drain holes 41 are used, the openings 36 and 40, either or both, may be provided with stub-tubes 53 and 54 as shown in Fig. 8. When stub-tubes are used the openings need not be slanting, as shown for opening 40 in Figs. 1, 2, and 5.

Further, the stub-tube 53, being extended to terminate directly behind the sheath of the bight of the U is disposed in a region where the sheath 35 acts as a baffle to prevent any moisture entering opening 25 from entering chamber 27 through the stub-tube 53.

At the bottom of chamber 27 and just to the left of plug 31 the casing is provided with one (or several if desired) relatively small hole 42. Any moisture that may, in spite of holes 41 and the effects of the heated plug 30 and the heated casing at holes 41, get into chamber 27 is thus discharged through hole 42. The heater, heating plug 31, and the casing in the region of plug 31, thus prevents clogging of this hole 42.

The left-hand end of tube 19 is also cut off on a bevel to facilitate assembly. In this arrangement the tube may be inserted until it touches plug 30 without blocking off the opening as might happen if it were cut off square. The end of tube 19 is in close relation to plug 30 so that said plug acts as a baffle to prevent moisture entering said tube. The pressure in tube 19 is thus truly representative of the dynamic fluid pressure of the fluid flowing longitudinally of the outside of the casing.

At the bottom and top of chamber 28 and just to the left of plug 32, the casing is provided with a plurality of small holes 43 and 44. The fluid entering chamber 28 through, say, holes 43 is heated by the heated plugs 31 and 32 and any moisture carried by the air entering chamber 28 is expelled through openings or holes 44. Further, since opening 40 slopes, in the direction of chamber 28, any moisture that may collect at the opening 40 flows back into chamber 28.

The pressure of the air in chambers 28 and 29 is thus truly representative of the static air pressure through which the casing 1 is moving. Tube 20 opens into chamber 29 and by a suitable pipe, not shown, connected to the pipe connection 22, the static air pressure is carried to the air speed indicating instrument.

While we have shown but few embodiments of our invention, it is, of course, apparent that changes may be made in details without departing from the spirit of our invention.

We claim as our invention:

1. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals to prevent the loss of any fluid pressure from the fourth chamber, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

2. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

3. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

4. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a four chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

5. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing.

6. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region slanting upwardly from the front toward the rear providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing.

7. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing, said heating unit comprising a sheath of corrosion-resistant metal, an electric conductor, and a magnesium oxide filler, said conductor being imbedded in the magnesium oxide in spaced relation to the sheath.

8. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing, said plugs being provided with means in their peripheries for retaining brazing material, whereby the plugs may be brazed to the casing by one brazing operation.

9. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region slanting upwardly from the front toward the rear providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing, said plugs being provided with means in their peripheries for retaining brazing material, whereby the plugs may be brazed to the casing by one brazing operation.

10. A Pitot tube comprising, in combination, an elongated casing pointed at the front having an opening at the front for receiving the dynamic pressure of the fluid flow component flowing toward the opening in the front of the casing, two spaced plugs within the casing, a rear closure, one plug being near the front of the casing and the other plug being between the front plug and the rear closure, said front plug having an opening at the mid region providing a communication from the region in front of the front plug to the region in front of the second plug, a dynamic fluid pressure collecting tube extending through the rear closure and the second plug to the region in front of the second plug, said tube having fluid tight sealing connections between the plug and closure to prevent fluid pressure from being dissipated past the tube, drain means at the bottom of the casing relatively near the front of the plugs, and a single U-shaped electrical heating unit having the ends of its legs extending through the rear closure and being supported by the plugs so that the bight lies in front of the front plug and the legs adjacent the inner surface of the casing, said heating unit comprising a sheath of corrosion-resistant metal, an electric conductor, and a magnesium oxide filler, said conductor being imbedded in the magnesium oxide in spaced relation to the sheath, said plugs being provided with means in their peripheries for retaining brazing material, whereby the plugs may be brazed to the casing by one brazing operation.

11. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals to prevent the loss of any fluid pressure from the fourth chamber, said electric heating unit comprising a sheath of austenitic corrosion-resistant steel, a metal conductor, and a magnesium oxide filler in the sheath, said metal conductor being imbedded in the magnesium oxide filler in spaced relation to the sheath, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

12. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said electric heating unit comprising a sheath of corrosion-resistant metal, a metal conductor, and a magnesium oxide filler in the sheath said metal conductor being imbedded in the magnesium oxide filler in spaced relation to the sheath, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

13. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said electric heating unit comprising a sheath of corrosion-resistant metal, a metal conductor, and a magnesium oxide filler in the sheath, said metal conductor being imbedded in the magnesium oxide filler in spaced relation to the sheath, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

14. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said electric heating unit comprising a sheath of corrosion-resistant metal, a metal conductor, and a magnesium oxide filler in the sheath, said metal conductor being imbedded in the magnesium oxide filler in spaced relation to the sheath, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

15. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals to prevent the loss of any fluid pressure from the fourth chamber, said plugs having peripheral grooves, brazing material in the grooves, whereby the plugs may be brazed to the inner surface of the casing, in fluid-tight relation, by a single brazing operation, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

16. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said plugs having peripheral grooves, brazing material in the grooves, whereby the plugs may be brazed to the inner surface of the casing, in fluid-tight relation, by a single brazing operation, said first plug having an opening providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

17. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said plugs having peripheral grooves, brazing material in the grooves, whereby the plugs may be brazed to the inner surface of the casing, in fluid-tight relation, by a single brazing operation, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

18. A Pitot-static tube comprising, in combination, an elongated casing pointed at the front having an opening at the front for receiving the dynamic pressure of the fluid flow component flowing toward the opening in the front of the casing, three spaced plugs disposed within the casing, a rear closure for the casing, said three spaced plugs and rear closure dividing the casing into four chambers, counting from the front toward the rear, namely, a first chamber, a second chamber, a third chamber, and a fourth chamber, a single U-shaped heating unit so supported by the plugs that the bight of the U-shaped unit extends into the first chamber and the legs of the U-shaped unit extend through chambers two, three and four into the rear closure, said rear closure being provided with electric terminals for connecting a source of electric energy to the ends of the legs of the heating unit, said terminals being insulated from the closure through fluid tight electric insulating seals, to prevent the loss of any fluid pressure from the fourth chamber, said plugs having peripheral grooves, brazing material in the grooves, whereby the plugs may be brazed to the inner surface of the casing, in fluid tight relation, by a single brazing operation, said first plug having an opening slanting upwardly from chamber one into chamber two providing a communication between chambers one and two, a dynamic fluid pressure collecting tube extending into chamber two through fluid tight seals through the rear closure and plugs three and two, said plugs being sealed at their peripheries to the casing, said third plug having an opening slanting upwardly from chamber three to chamber four providing a communication between chambers three and four, drain means at the bottom of the casing directly in front of each plug, said casing being provided with openings in the side thereof between plugs two and three, a static fluid pressure collecting tube extending into chamber four through a fluid tight seal in the rear closure.

19. In combination with electrically heated speed measuring means, having a tube, having a nose, mounted on a vehicle to point in the direction in which the vehicle is moving with reference to the medium through which it moves, a single U-shaped electric heater unit having the outer portions of the legs of the U shaped to conform to the inner contour of the tube, a plurality of generally cylindrical plugs, having slots in the surfaces thereof in parallel relation to the plug axes, for receiving the legs of the U-shaped heater unit at spaced points thereof, said legs filling the slots so that the plugs and legs present an outer contour fitting the inner contour of the tube, said plugs and U-shaped heater being disposed to fit snugly within the tube and being brazed to the tube.

20. In combination with electrically heated speed measuring means, having a tube, having a nose, mounted on a vehicle to point in the direction in which the vehicle is moving with reference to the medium through which it moves, a single U-shaped electric heater unit having the outer portions of the legs of the U shaped to conform to the inner contour of the tube, a plurality of generally cylindrical plugs, having slots in the surfaces thereof in parallel relation to the plug axes, for receiving the legs of the U-shaped heater unit at spaced points thereof, said legs filling the slots so that the plugs and legs present an outer contour fitting the inner contour of the tube, said plugs and U-shaped heater being disposed to fit snugly within the tube and being brazed to the tube, certain of said plugs being provided with openings, and stub-tubes in said openings projecting forwardly beyond the front face of the plugs and thus providing a baffle for fluid communication from one side of the plugs provided with the stub-tubes to the other sides of the plugs.

21. In combination with electrically heated speed measuring means, having a tube, having a nose, mounted on a vehicle to point in the direction in which the vehicle is moving with reference to the medium through which it moves, a single U-shaped electric heater unit having the outer portions of the legs of the U shaped to conform to the inner contour of the tube, a plurality of generally cylindrical plugs, having slots in the surfaces thereof in parallel relation to the plug axes, for receiving the legs of the U-shaped heater unit at spaced points thereof, said legs filling the slots so that the plugs and legs present an outer contour fitting the inner contour of the tube, said plugs and U-shaped heater being disposed to fit snugly within the tube and being brazed to the tube, the front plug being provided with an opening, and a projecting stub-tube disposed in the opening to provide a baffle and a fluid communication from the nose region of the tube to the region back of the plug, said stub-tube terminating near the bight of the U-shaped heater unit so that the heater unit acts as a baffle for the stub-tube opening.

KENNETH L. WOODMAN.
ELDRED O. MORTON.